(12) United States Patent
Barraclough et al.

(10) Patent No.: US 9,438,567 B1
(45) Date of Patent: Sep. 6, 2016

(54) LOCATION-BASED REMOTE MEDIA ACCESS VIA MOBILE DEVICE

(75) Inventors: Keith Barraclough, Mountain View, CA (US); David Irvine, San Jose, CA (US)

(73) Assignee: NOKIA CORPORATION, Espoo (FI)

( * ) Notice: Subject to any disclaimer, the term of this patent is extended or adjusted under 35 U.S.C. 154(b) by 1505 days.

(21) Appl. No.: 11/599,669

(22) Filed: Nov. 15, 2006

(51) Int. Cl.
H04L 29/06 (2006.01)

(52) U.S. Cl.
CPC .......... *H04L 63/0428* (2013.01); *H04L 63/08* (2013.01); *H04L 63/108* (2013.01)

(58) Field of Classification Search
CPC ... H04L 63/04; H04L 63/0428; H04L 63/08; H04L 63/10; H04L 63/108; H04L 65/60; H04L 65/601; H04L 65/605; H04N 21/4516; H04N 21/4532
USPC ............ 713/193; 726/26, 27, 28, 29; 705/59
See application file for complete search history.

(56) References Cited

U.S. PATENT DOCUMENTS

| | | | |
|---|---|---|---|
| 4,979,118 A | 12/1990 | Kheradpir | |
| 5,774,660 A | 6/1998 | Brendel et al. | |
| 5,862,325 A | 1/1999 | Reed et al. | |
| 5,920,701 A | 7/1999 | Miller et al. | |
| 5,996,022 A | 11/1999 | Krueger et al. | |
| 6,006,264 A | 12/1999 | Colby et al. | |
| 6,067,565 A | 5/2000 | Horvitz | |
| 6,112,225 A | 8/2000 | Kraft et al. | |
| 6,161,133 A | 12/2000 | Kikinis | |
| 6,167,438 A | 12/2000 | Yates et al. | |
| 6,237,786 B1 * | 5/2001 | Ginter et al. ................. 213/153 |
| 6,308,209 B1 | 10/2001 | Lecheler | |
| 6,308,222 B1 | 10/2001 | Krueger et al. | |
| 6,493,758 B1 | 12/2002 | McLain | |
| 6,577,601 B1 | 6/2003 | Wolpert | |
| 6,678,244 B1 | 1/2004 | Appanna et al. | |
| 6,697,333 B1 | 2/2004 | Bawa et al. | |
| 6,751,664 B1 | 6/2004 | Kogan et al. | |
| 6,871,236 B2 | 3/2005 | Fishman et al. | |
| 6,888,477 B2 | 5/2005 | Lai et al. | |
| 6,925,495 B2 * | 8/2005 | Hegde et al. ................. 709/223 |
| 6,937,168 B2 | 8/2005 | Rao et al. | |
| 7,120,702 B2 | 10/2006 | Huang et al. | |

(Continued)

OTHER PUBLICATIONS

May 25, 2000, Ben Hammer, "GPS to do wonders for wireless browsing" posted on the world wide web.

(Continued)

*Primary Examiner* — Saleh Najjar
*Assistant Examiner* — Devin Almeida
(74) *Attorney, Agent, or Firm* — Ditthavong & Steiner, P.C.

(57) ABSTRACT

Data transfer is effected by a remote packet-communicating device to facilitate the transfer of data from a data source to another device that is local to the remote device. According to an example embodiment of the present invention, a host server provides access to a user's data source (e.g., at a registered user's PC) in response to a request from a remote packet-communicating device. The remote device directs the host server to facilitate the transfer of data from the data source to another device that is local to the remote device. In one implementation, a remote device and a media playback device are in communication on a local area network (LAN), and the remote device controls the communication of data from the data source to the media playback device, by interacting with a host server via a packet-communicating network and a gateway at the LAN.

18 Claims, 5 Drawing Sheets

(56) References Cited

U.S. PATENT DOCUMENTS

| | | |
|---|---|---|
| 7,139,834 B1 | 11/2006 | Albanese et al. |
| 7,516,188 B2 * | 4/2009 | Morris ................... 709/208 |
| 2002/0174246 A1 | 11/2002 | Tanay et al. |
| 2003/0061387 A1 | 3/2003 | Brown et al. |
| 2003/0097564 A1 * | 5/2003 | Tewari et al. ............. 713/171 |
| 2003/0110234 A1 | 6/2003 | Egli et al. |
| 2003/0177269 A1 | 9/2003 | Robinson et al. |
| 2003/0200337 A1 | 10/2003 | Jabri et al. |
| 2004/0003132 A1 | 1/2004 | Stanley et al. |
| 2004/0139233 A1 | 7/2004 | Kellerman et al. |
| 2004/0250291 A1 | 12/2004 | Rao et al. |
| 2004/0267954 A1 | 12/2004 | Shen |
| 2005/0132264 A1 | 6/2005 | Joshi et al. |
| 2006/0010074 A1 * | 1/2006 | Zeitsiff ................ G06F 21/10 705/52 |
| 2006/0143295 A1 * | 6/2006 | Costa-Requena et al. ... 709/227 |
| 2008/0005348 A1 * | 1/2008 | Kosiba et al. ............. 709/231 |

OTHER PUBLICATIONS

Nov. 1999, "BackWeb® Foundation 5.5 Technical White Paper".
Jun. 2002, UPnP AV Architecture: 0.83 dated Jun. 12, 2002.

\* cited by examiner

LOCATION-BASED REMOTE MEDIA ACCESS VIA MOBILE DEVICE

FIELD OF THE INVENTION

The present invention relates generally to communications and, more particularly, to the control of user devices for content access and playback over a packet-based network, using a mobile device local to the user device to facilitate the transfer and playback of the content.

BACKGROUND OF THE INVENTION

Data communications over a variety of networks, such as packet-based networks, mobile telephone networks and others have increased at an astonishing rate over recent years. The affordability and availability of computers, telephones, wireless devices and other network access appliances has made their use prevalent in a variety of applications. Further, as the demand for network access devices has increased, the diversity in types of network access appliances has also increased, with different devices often implementing different protocols and performance-based operational characteristics.

As access to packet-based networks such as the Internet becomes easier, convenient and readily available, these networks are increasingly used for transferring data such as images, audio, email, video and text. In this regard, the number of network subscribers, data providers, and requests by those subscribers for data transfer, streaming data and other content are growing exponentially. Users are increasingly relying upon such networks for data transfer, and are further placing higher expectations on their ability to access content at different locations using different network access devices in a flexible, controllable manner.

Content (e.g., audio, images or video) has evolved in application and is readily stored electronically and is transferable over packet-based networks as described above. For example, the storage of music and/or video in rewritable electronic media has become a popular method in which to maintain and access media collections. Another example involves video applications, where digital recording and storage of television and personal video collections has become popular, as has the streaming (via the Internet) of audio and video. Photos are also often stored and accessed electronically.

In many applications, access to data or other content by users owning or subscribing to the data is desirably flexible and controllable by such users. For example, owners of digital audio content often desire access to their content from a variety of different devices, such as a personal audio player, an automobile audio system, or a home audio system. However, previous systems and approaches for network data transfer are generally limited in their ability to meet demands for flexible, controllable access to data or other content in a reliable, secure, efficient and affordable manner. In addition, such systems and approaches have been generally limited in their ability to facilitate access to a multitude of different types of content using different devices.

As applicable to conventional documents and other types of data (e.g., text-based documents, spreadsheets or presentations), the demand for flexible and efficient access to such data has also grown. For example, many workplaces have become increasingly mobile; employees are often working from a remote location such as at home or at traveling locations. Access to data from remote locations has been particularly useful for facilitating mobility while maintaining a desirable level of access to information. However, the growing size of data files desirably transferred to facilitate mobility or to otherwise provide flexible data access has presented challenges to the delivery of such data over communications channels. For instance, email is generally limited in its ability to transfer large data files, such as audio, video, text and presentation files.

Another challenge to data transfer and management stems from the existence of a myriad of different types of data, as well as different types of data access appliances. For example, a variety of different data types are implemented for storing audio files. Often, these data types are associated with a particular type of digital audio device that is being used for playback. In addition, with each data type, there are often different manners in which the data is stored, typically involving different levels of quality (e.g., with different playback bitrates). In this regard, a digital audio player must not only have access to data but also have access to data in a particular format.

Effectively and efficiently making content and other data readily accessible has been challenging in the face of the advancement of technologies and trade channels that use or could use network-based data transfer.

SUMMARY OF THE INVENTION

The present invention is directed to approaches to data routing, management and associated applications for making a registered user's data accessible to a remote device. The present invention is exemplified in a number of implementations and applications, some of which are summarized below.

According to an example embodiment of the present invention, an approach to data routing and sharing involves the use of a user's remote device to control the communication of data to from the user's registered data source to another network-based device that is local to the user's remote device.

According to another example embodiment of the present invention, a system is implemented for communicating content from a registered user's content source on a first network to a remote media playback device on a remote network coupled to the first network by a gateway. The system is implemented in a network environment involving registered users who subscribe to remote host-controlled remote media access to registered-user media content over a packet-based network. The system includes a host server coupled the first network to access registered-user content sources to direct media content delivery for registered users;

a registered-user content source programmed to communicate with the host server via the first network and to respond to the host server by communicating media content over the first network;

a media server arrangement that facilitates communication between a registered-user's mobile device and the host server, by accessing the remote network and, via the gateway, accessing the first network; and wherein the host server is adapted respond to registered-user media requests initiated at the registered-user's mobile device and received via the media server by authenticating the requests and, in response to the authentication, controlling the registered-user content source to communicate the requested media over the first network for delivery to the remote media playback device through the gateway and over the remote network.

The above summary of the present invention is not intended to describe each embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
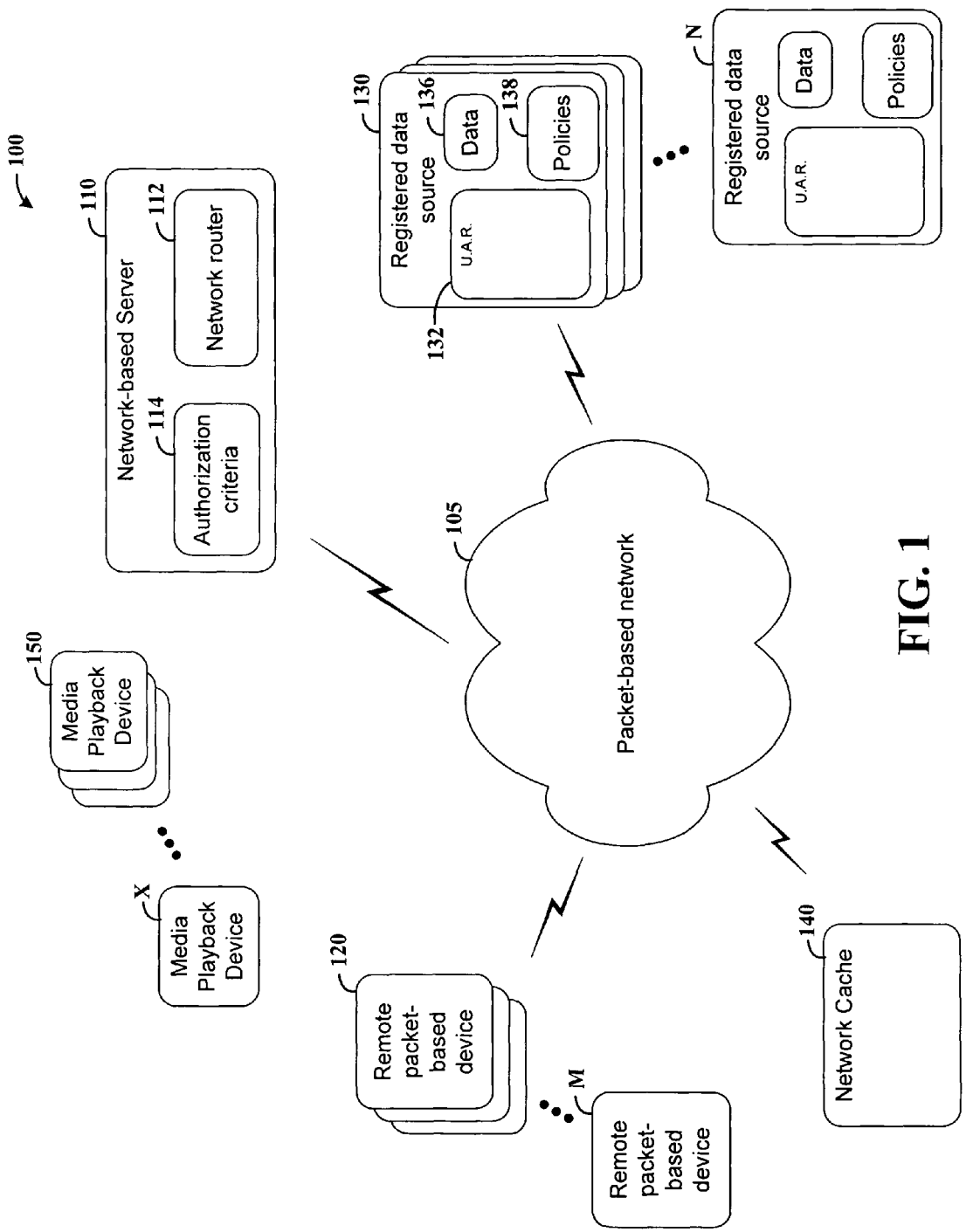
FIG. 1 is a system for routing data via a packet-based network using a server-hosted data access approach with remote control for delivery of data, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications, and the invention has been found to be particularly suited for providing controlled, remote access to registered-user data over packet-based networks such as the Internet. A remote controlling device is used to facilitate access to the registered-user data by another remote device that is local to the remote controlling device (e.g., communicates over a common local network). While the present invention is not necessarily limited to such applications, various aspects of the invention may be appreciated through a discussion of various examples using this context.

In connection with various example embodiments of the present invention, a host server interacts over a packet-based network with a user's data source and an authorized user at a controlling remote device, to provide data from the user's data source to a media playback device local to the controlling remote device. The authorized user accesses the host server by way of a local network on which the media playback device resides, and a gateway coupled to the packet-based network on which the host server and data source reside. The host server authenticates the user and controls the data source for routing data to the gateway and over the local network to the media playback device.

Remote control access is facilitated in one or more of a variety of manners over a variety of networks. In one instance, a registered user at the controlling remote device directs the delivery of data to a remote media playback device at a particular premises (e.g., a friend's home) by accessing a local network and by using a network protocol such as UPnP protocol (discussed below) to communicate with the media playback device. The registered user accesses the host server via an Internet web page by accessing the Internet using a gateway and a local area network (LAN) at the premises. The registered user provides authentication criteria to the host server, which uses the criteria to authenticate the registered user and to provide access to the registered user's media source. For authenticated users, the host server processes requests received from the authenticated user by transferring media content from the media source to the remote media playback device, via the Internet, the gateway and the LAN. The media playback device is used to play back the transferred media content.

In many applications, such data is desirably transferred or shared from a user's data source at the user's local network, such as a computer, media recorder (e.g., a digital video recorder or digital audio recorder), broadcast receiving device (e.g., a television receiver, radio receiver or satellite receiver), a gaming device, a mobile telephone or other network access appliance on the local network. For example, users can access content such as music, video, news services, games and other data remotely via the Internet and, for many applications, via wireless networks such as those implemented for cellular telephones.

In the examples herein, the registered user's data source is generally either packet-based itself, or is coupled to a packet-based device to facilitate delivery of data from the data source over a packet-based network. In this regard, the data source, as referred to above and/or in other locations herein, generally refers to a single device and/or a system that is capable of both presenting data for transfer over a packet-based network and of communicating over the packet-based network. For instance, one such device/system involves an Internet modem and a personal computer that stores and/or has access to media content directly or via a communications link such as a LAN. The data source communicates with the host to establish a communications link therewith, and facilitates data transfer at the direction of the host (or at the direction of user commands received from a remote registered user that is granted access to the data source by the host). In some applications, data transfer is via the host, and in other instances, directly from the data source to a remote media playback device.

In one particular example embodiment, a media communications system and approach is implemented as follows. A user having a home-based local area network (LAN) registers with a host server for remote data access, and installs software on a personal computer (PC) connected to the home LAN. The user sets preferences, such as access criteria (user name, password), media to share and media sources from which to provide media. For purposes of illustration, the user sets files to share to include recorded television programs and/or movies present on the user's digital video recorder, music stored on a digital audio player, and images stored on the user's PC.

Once registered, the user's PC connects to the host server upon power up or other condition, such as a user-initiated connection. The host establishes a persistent connection to the user's PC to facilitate remote access at a later time. The software programmed to the user's PC works with the host to maintain this connection, and is responsive to commands from the host in this regard, as well as for facilitating the transfer of data.

When the user wishes to control remote access to the media content, the user accesses a web page hosted by the host, by way of a remote Internet access device such as a hand-held wireless telephone-type device. The user provides authentication information, such as the user name and password described above, and in response the host authenticates the user as an authorized user, and facilitates media access accordingly.

The registration and access approaches in the aforesaid particular example are applicable for implementation with a variety of media communications types. Continuing with one aspect of the particular example discussed above, the registered user, once authenticated, controls the delivery of the user's media content to a third party's media playback device as follows. The user accesses a third-party LAN (e.g., a network at a friend's home or at the user's office) on which the media playback device resides by establishing a wireless communication with a device on the third-party LAN. In some applications, the user also accesses the hosted web page as described above, via the third-party LAN and an Internet communications device residing on the third-party LAN.

To facilitate playback on the media playback device, the registered user provides, either directly or by way of accessing the hosted web page via the third-party LAN, information to the host that identifies the third-party LAN with enough information to facilitate the delivery of media content thereto. For instance, where a registered user accesses the Internet by making a wireless connection to a wireless access point (WAP) on the third party LAN, and then accessing the Internet by way of a broadband gateway on the third-party LAN, the address of the gateway is recognizable by the host. The user then selects media content at the data source for playback on the media playback device, and the host responds by facilitating delivery of the selected media content to the third-party LAN via the broadband gateway.

In one application, the media playback device is a television (or television system having a media renderer) that receives media via the third-party LAN, and the registered user accesses the host to request the transfer of a recorded television broadcast stored at the user's digital video recorder on the user's LAN. The registered user communicates via the third-party LAN to communicate with the media playback device, and to direct the host to facilitate the delivery of the recorded television broadcast from the digital video recorder, over the Internet (e.g., via the host), and to the gateway at the third-party LAN. In some applications, the host facilitates the delivery of media content in a streaming format. In other applications, the host facilitates the delivery of media content in a format involving the transfer of an entire media file (e.g., an entire television program), or with a combination of approaches.

A proxy server is implemented at the third-party LAN, and facilitates the delivery of received data to the media playback device and, where appropriate, facilitates access to the Internet by the registered user. Such a proxy server is implemented, for example, at the registered user's remote controlling device, or at a device on the third-party LAN such as a computer or a gateway. In certain embodiments, the proxy server is programmed with software that communicates with the host; this software may, for example, be preprogrammed at the direction of a user, or may involve Internet-access based program functions, such as those temporarily downloaded for use during a particular data transfer session.

Once provided to the third-party LAN, media data received at the gateway is provided for playback. In some applications, one or more devices on the third-party LAN control the playback of the received media by directing the delivery of the data to an appropriate playback device. In other applications, the registered user's remote device communicates with a television or other media playback device on the third-party LAN to direct the received media data to the appropriate playback device and, in some instances, to control aspects of the playback such as volume, pause, rewind, resolution and others.

In view of the above, a registered user can thus use his or her mobile Internet device such as a mobile telephone, together with the host server and an appropriately programmed PC at his or her home, to access recorded media from a multitude of remote locations and to control the playback of the media at these remote locations. Effectively, these embodiments extend the registered user's home audio or video system to practically any system, anywhere in the world, having Internet access and a media playback device; the context of a user's home entertainment system is expanded from a location in the user's home to any appropriate location on the entire world wide web.

Moreover, as is evident by the proliferation of packet-based communications in a multitude of environments, these approaches are applicable for the delivery of media content to locations having Internet access in general, not necessarily requiring a LAN in the traditional context or as described above. In this regard, these approaches are applicable to the delivery of media to "LAN" locations such as an automobile, airplane, public bus, subway, coffee shop, airport and others. In addition, relative to the above discussion of a third-party LAN, the functions carried out thereby may involve a single device having capabilities including Internet access capabilities, media playback capabilities, and local wireless capability for communicating with the user's remote Internet access device and for providing Internet access to that device.

The above approaches, as well as those discussed in the figures, are selectively implemented in connection with one or more example embodiments as described in U.S. patent application Ser. No. 09/843,249 entitled "Data Routing Monitoring and Management," filed Apr. 26, 2001, and in U.S. patent application Ser. No. 11/056,345 entitled "Network-distributed Data Routing," filed Feb. 11, 2005. For example, various approaches to data transfer, user registration, data caching, remote access and more, as described in U.S. patent application Ser. No. 11/056,345, are implemented to facilitate remote control of and access to data such as media at a remote playback device as described herein.

In connection with the examples described herein, data that is made available for remote access includes data that is available to a registered user's packet-communicating device, such as a personal computer, set top box, web camera, secure monitoring system and/or content storage system at a home or business location with network access, or any combination thereof. Furthermore, a remote user (e.g., using a remote packet-based device) may include one or more individuals, such as members of a household, employees of a business entity or simply an individual given access authorization by a registered user. Further, a "user" may be a machine functioning automatically, for example, as programmed by an individual.

In the context of various examples described herein and shown in the figures, reference is made to several representative devices, networks and network communication approaches. Various terms such as Internet, UPnP, UPnP AV, web-enabled, packet, packet-based and others may be applicable in the context of different embodiments to facilitate the description of different examples. However, the devices, networks and network communications approaches described in connection with example embodiments herein may be applicable to variety implementations and descriptive terms. For instance, devices that could be described as a packet-based or Internet appliance may include one or more devices that communicate over a path characterized by one or more of a packet-communicative, web-based and/or Internet-based communications link. In this regard, devices referred to as packet-based or Internet-related are selectively implemented using one or more of a variety of packet-communicative approaches. Such devices may, for example, access the Internet via non-Internet-based communications approach, such as via one or more wired and/or wireless links that use one or more of a variety of communications approaches. Moreover, packet-communicative approaches described herein are applicable to a variety of network communications approaches, including those involving communications referred to in connection with one or more terms relating to packet, frame, block, cell and segment terms.

Turning now to the figures, FIG. 1 shows a network arrangement 100 that facilitates authenticated remote user access to data at a data source, involving transfer of data from the data source to a media playback device at the remote user's location, in connection with other example embodiments of the present invention. The system 100 includes a network-based server 110, a plurality of remote packet-based devices 120-M, a plurality of registered data sources 130-N and a plurality of media playback devices 150-X, all of which communicate via a packet-based network 105. The remote packet-based devices 120-M include, for example, a mobile telephone, a portable computer (e.g., a laptop PC), digital media device such as an mp3 player or video player or a personal data assistant (PDA) device. Such devices may also be implemented as the registered data sources 130-N, and generally facilitate access to registered-user data at a media playback device either directly or via a network cache 140.

The network 105 includes one or more packet-based networks such as the Internet and, where appropriate, other networks such as a mobile telephone network or a local area network (LAN). In some applications, the network 105 is a local area network implemented for a locality such as a home or business. In other applications, the network 105 is or includes a virtual network or set of virtual application communication channels within a processor or group of processors associated with a computing appliance.

Where implemented, the network cache 140 includes data storage media and has access to the packet-based network 105. While shown as a single item in FIG. 1, the network cache 140 may be implemented with a plurality of devices, at one or more of a plurality of locations. For example, some or all of the network cache 140 may be located at the network-based server 110 or at the registered data source 130.

Each of the registered data sources 130-N includes a user application router (U.A.R.) (see U.A.R. 132 of registered data source 130) that facilitates communication between the registered data source and the network-based server 110, and directs the routing of data 136 from the registered data source over the packet-based network 105, in accordance with predefined policies 138.

The network-based server 110 includes a network router 112 that communicates with the registered data sources 130-N for directing the routing of data therefrom. The network-based server 110 also directs or otherwise controls the caching of data in the network cache 140, and the delivery of cached data to a media playback device. The network-based server 110 uses authorization criteria 114 to facilitate remote access for playback at media playback devices 150-X, at the control of user inputs at remote packet-based devices 120-M, to registered user data. Authorization criteria 114 includes authorization information for registered users that is used to authenticate users accessing the network-based server 110 from a remote device. In some applications, the authorization criteria 114 also specifies user preferences for accessing data or other data-transfer-related functions.

Generally, the system 100 implements one or more of the various embodiments as described above (prior to the discussion of FIG. 1), using the network-based server 110 to host the transfer of data (e.g., media content) to one of the media playback devices 150-X. For instance, a user at the remote packet-based device 120 (implemented with a mobile telephone) may control playback of media using a LAN on which the media playback device 150 resides. The user accesses a web page hosted by network-based server 110, using the mobile telephone 120 (e.g., via the aforesaid LAN), provides authentication data and directs the transfer of data 136 (implemented here as video content) to the video playback device 150. Such a LAN generally forms part of the packet-based network 105, and may involve the use of a gateway or other device, to access another part (e.g., the Internet) of the packet-based network 105 on which the network-based server 110 and the registered data sources 130-N reside.

In some embodiments, a proxy device (or software implementation thereof) that integrates communications protocol types is implemented with the remote packet-based devices 120-M, and in other embodiments, with device residing on a portion of the packet-based network 105 that is local to a media playback device. For instance, where the media playback device 150 communicates using a protocol such as a UPnP protocol (described in further detail below), the proxy device facilitates the communication of media or other data received at the direction of the network-based server 110, to the media playback device 150. In this regard, the proxy device communicates using protocols associated with the media playback device 150 (e.g., with a local network on which the media playback resides) as well as with protocols associated with the network-based server 110 and associated communications. Where UPnP protocols are used in facilitating playback at the media playback device 150 on a local network, the proxy device effects the ability to communicate UPnP-type actions in association with another network (e.g., a wide area network (WAN), such as the Internet) that is part of the packet-based network 105. Where implemented separately from a remote packet-based device, the proxy device also communicates with remote packet-based devices in the vicinity of the media playback device 150, over a LAN or other communications link. In some applications, such a separate proxy device is located at a LAN on which the media playback device 150 resides, and in other applications, is coupled directly to the media playback device.

Figure 2:
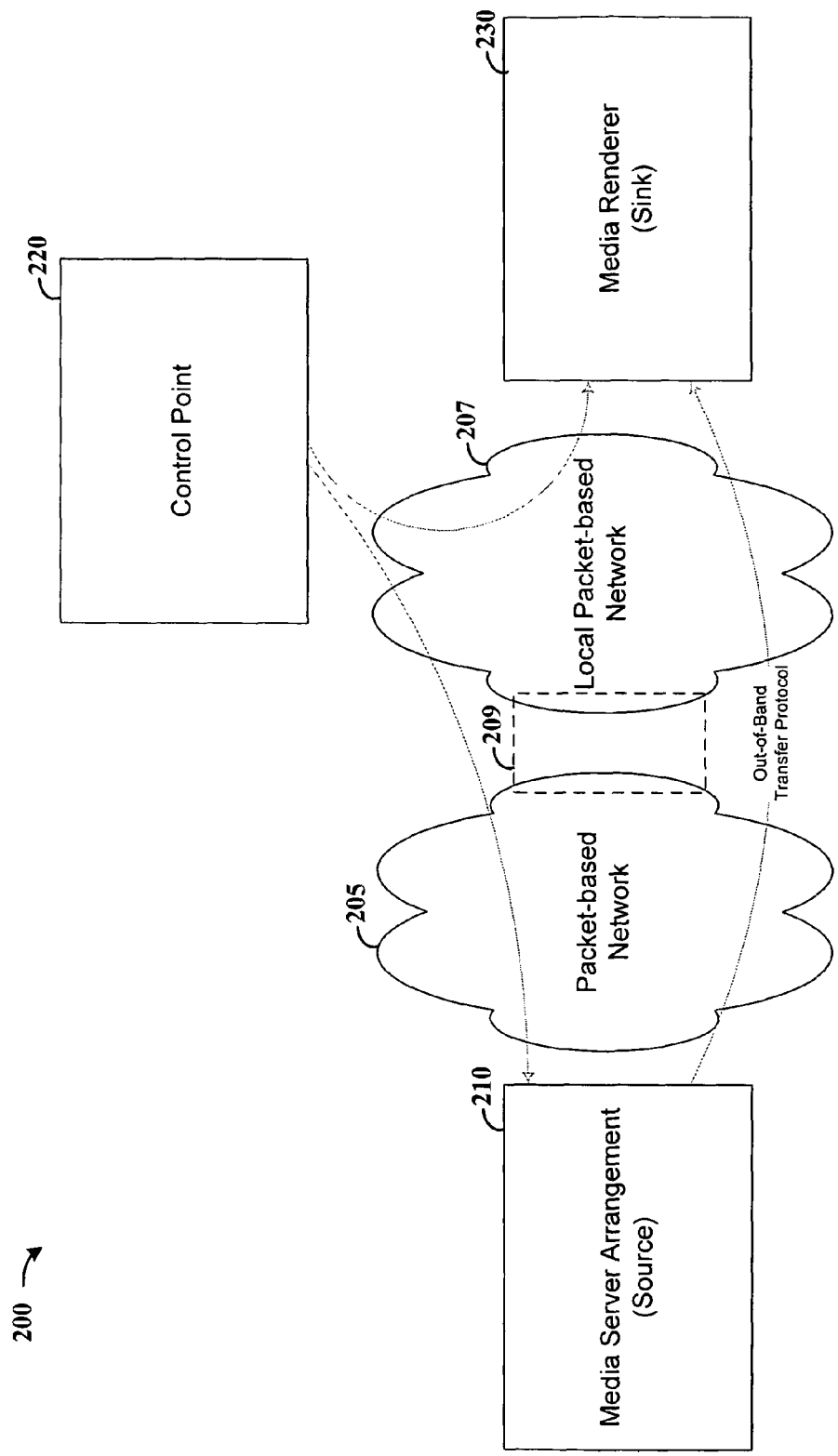
FIG. 2 shows a system for providing remote access to user data, according to another example embodiment of the present invention.

FIG. 2 shows a system 200 and approach to the routing of data, according to another example embodiment of the present invention. In some applications, one or more of the approaches shown in FIG. 2 and described herein are implemented with the system 100 in FIG. 1 and/or with other embodiments discussed above, and are described here accordingly. Further discussion of aspects of FIG. 1 follows below.

The system 200 includes a media server arrangement 210, a control point 220 and a media renderer 230. The media server 210 is remote a source of user media to be provided for playback at the media renderer 230, at the control of the control point 220, over a packet based network 205 such as the Internet. Generally, the media server arrangement 210 includes a host and a data storage device, such as a user's PC, which communicate over the packet-based network 205; the host facilitates controlled access to data at the data storage device. The control point 220 is implemented using a remote packet-based device such as a mobile telephone, and the media renderer 230 includes a media playback device, local to the remote packet-based device and coupled to receive media delivered via the packet-based network. The control point 220 and media renderer 230 communicate with a local network 207, which is coupled to the packet-based network 205 (e.g., using a gateway 209 or other approach).

The control point 220 communicates with the media renderer 230 to control the playback of media at the media renderer. The control point 220 also communicates with the media server 210 to control the delivery of media from the media server to the media renderer using, for example, a network such as the Internet, with an out-of-band transfer protocol (i.e., a transfer protocol different than, for example, a protocol implemented for communications between the control point and the media renderer 230).

The media server 210, control point 220 and media renderer 230 as shown in FIG. 2 include one or more devices and, in some instances, include devices that are implemented at different locations on a packet-based network. For example, relative to FIG. 1, the media source 210 may be implemented with the registered data source 130 and, in some contexts, involve functions carried out by the network-based server 110 in providing data to the media renderer 230. In a similar context, the control point 220 may be implemented with the remote packet-based device 120.

In many applications, the arrangement 200 is implemented with a UPnP approach, such as that described with the UPnP AV Architecture: 0.83, dated Jun. 12, 2002, with the UPnP MediaServer:2 Device Template Version 1.01, dated May 31, 2006, and the UPnP MediaRenderer:2 Device Template Version 1.01, dated May 31, 2006, all of which are available from the UPnP Forum. In certain contexts, various embodiments of the present invention are directed to such UPnP approaches, wherein a user's control point (e.g., mobile telephone) interacts with devices using a UPnP approach, but extending the effective UPnP network to include a device at the user's data source.

Referring back to FIG. 1, and as may be implemented with the system 200 shown in FIG. 2, for some applications, the network router 112 and the U.A.R. 132 (using registered data source 130 by way of example) facilitate communications between each other as follows. When the registered data source 130 powers up, connects to the packet-based network 105 or endures another condition (where no current communications link is established with the network-based server 110), it automatically initiates contact the network-based server. The network-based server then responds to the contact by authenticating the registered data source 130 via authorization criteria 114, and uses the information in the initiating contact to communicate back to the registered data source 130 over the packet-based network 105, therein establishing a communications link. This communications link is then kept active and used for the passing of control information from the network router 112 for controlling the passing of data from the registered data source 130.

Using registered data source 130 by way of example, the data source and/or the server 110 uses policies 138 in determining approaches for providing access to data 136, such as those specifying what portions of the data are available for access, interaction with the cache 140, and other conditions as appropriate. For instance, the policies 138 may specify a particular data folder or other location that is to be made accessible for transfer to media playback devices. The U.A.R. 132 and/or the network router 112 is responsive to such a policy by making the particular data folder available to the server 110 (and, ultimately, to a media playback device).

In some applications, the network router 112 facilitates the storage of data at the network cache 140, and access to the stored data at the cache. For instance, data pushed to the network cache 140 may be sent via the network-based server 110. Similarly, updated data for the network cache 140 may be sent via the network-based server 110. Requests for deletion of data from the network cache 140 from the caching engine 134 may also be sent to the network-based server 110, which responds by directing the deletion of the data in the network cache.

In another embodiment, the system 100 facilitates electronic token-based access to registered data as follows. When a user (e.g., owner) of registered data source 130 wishes to share particular data with another user (or to personally remotely access the data), the registered user directs the creation of an electronic token that specifies information that can be used to identify the data to which access is to be provided. The data that is the subject of the token is made available, and in some instances pushed to the network cache 140, and the electronic token is provided for access by a remote user. When such a remote user implements the token (e.g., by providing the token with authorization information to the network-based server 110), the network-based server responds by directing appropriate data to a particular media playback device specified via the requesting remote user. For general information regarding data transfer, and for specific information regarding token-based data transfer applications that may be implemented in connection with these and other example embodiments, reference may be made to U.S. patent application Ser. No. 11/374,414, entitled "Token-based Remote Data Access" and filed on Mar. 13, 2006, which is fully incorporated herein by reference.

The system 100 is adapted to work in a variety of environments involving disparate networks, data source devices, remote packet-communicating devices, data and characteristics thereof. One particular use scenario involves the registration of a user and subsequent remote data access as follows. When a particular user who is party to the registered data source 130 (e.g., a homeowner having media content stored at his or her home computer) wishes to establish remote access to data, the user signs up for a service provided via the network-based server 110. The network-based server 110 prompts the user for access information to the user's registered data source 130 so that the network router 112 can interact with the registered data source. This access information (e.g., user names, passwords, access restrictions) is stored with authorization criteria 114.

Once registered and programmed with appropriate software or otherwise appropriately configured, the registered data source 130 makes data 136 available for delivery to a media playback device. Once data is made available either directly via the registered data source 130 and/or via the network cache 140, a user at one of the remote packet-based devices 120-M can request the transfer of data from the registered data source 130 to a media playback device with appropriate authorization and data transfer control, also as discussed above.

Data is transferred in the system 100 in one or more of a variety of manners. The following example approach involves remote user access to data originating at a registered-user's data source. For illustration, this example is discussed in the context of a remote user at the remote packet-based device 120 accessing data originating at registered data source 130, with a portion of the data 136 stored at the network cache 140.

The network-based server 110 hosts a web page accessible by the remote packet-based device 120. The remote user introduces the remote packet-based device to the vicinity of a LAN or other network on which the media playback device 150 resides, accesses the hosted web page, via the LAN, at the remote packet-based device 120. The remote user provides authorization information that is presented to the network-based server 110. In response, the network-based server uses the authorization criteria 114 with the provided authorization information to either authorize or deny the user access to data originating from the registered data source 130. In some applications, this authorization is selective based upon the type of data requested by the user. Once authorized, a data access request initiated by the user at the remote packet-based device 120 is processed by the network-based server 110, which facilitates the transfer of data from the registered data source 130 to the media playback device 150. In some applications, the network-based server 110 presents authorized user a web page or other information from which the user can select media for transfer.

Data transfer to the media playback device 150 is effected in different manners, depending upon the application, available equipment, characteristics of the media playback device or other condition. In some applications, data is routed through the network-based server 110 and passed to the media playback device 150 via the LAN (or other network as discussed). In other applications, data is routed directly from one or both of the registered data source 130 and the network cache 140 to the media playback device 150 (via the packet-based network 105), without necessarily passing the data through the network-based server 110.

Various aspects of the system 100, relating to the subscription of users, the communication of information between a network host and user's data source, the provision of user data over a packet-based network, the authentication of users and more, are implemented in a variety of manners, depending upon the application. In this regard, for general information regarding data transfer, and for specific information regarding approaches to the transfer of data to a media playback device in accordance with one or more example embodiments, reference may be made to U.S. patent application Ser. No. 11/056,345, referenced above.

Figure 3A:
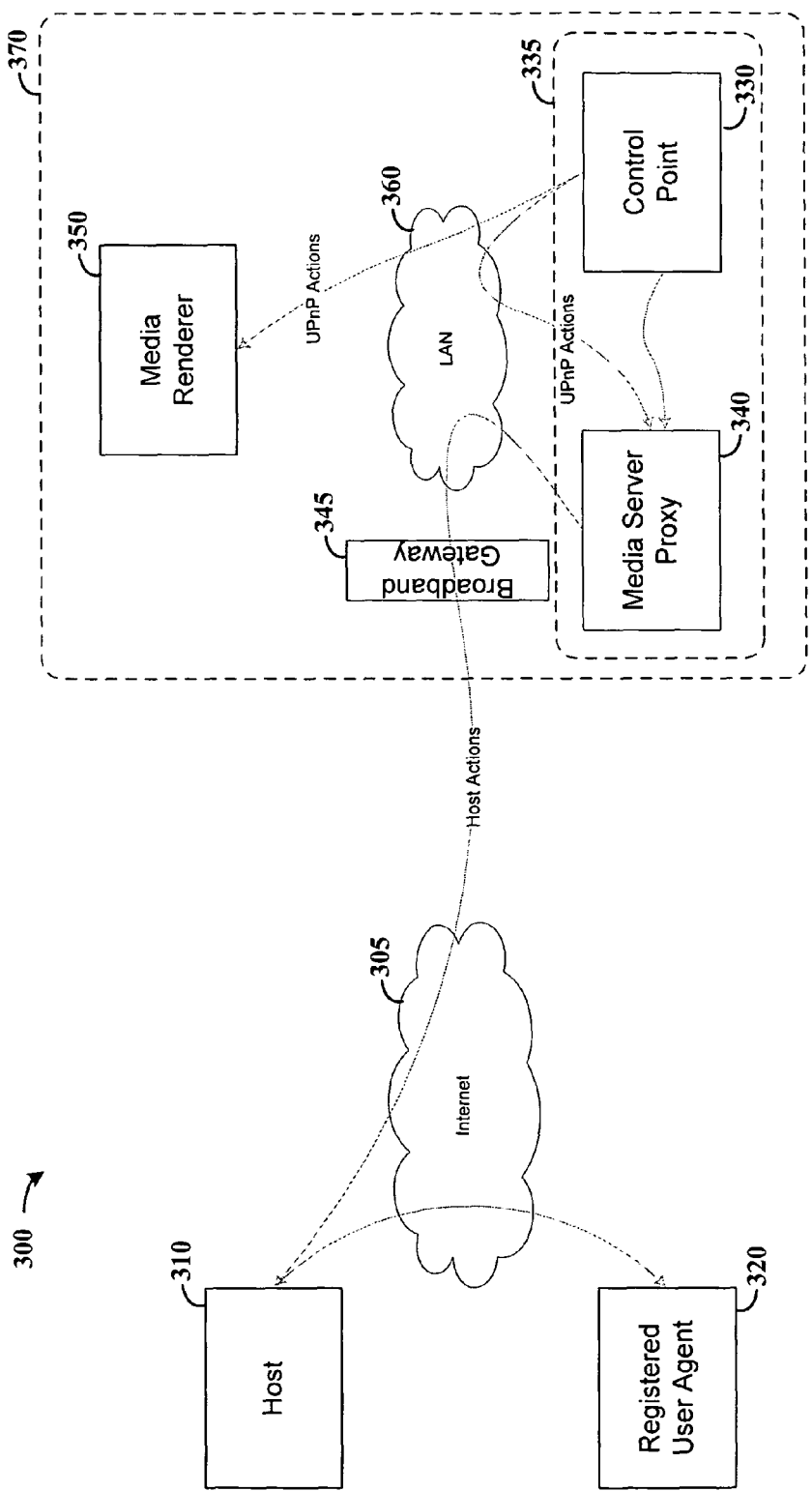
FIG. 3A and FIG. 3B show an arrangement and approach for controlling content delivery, respectively showing control communications and subsequent content delivery approaches, according to another example embodiment of the present invention.
Figure 3B:
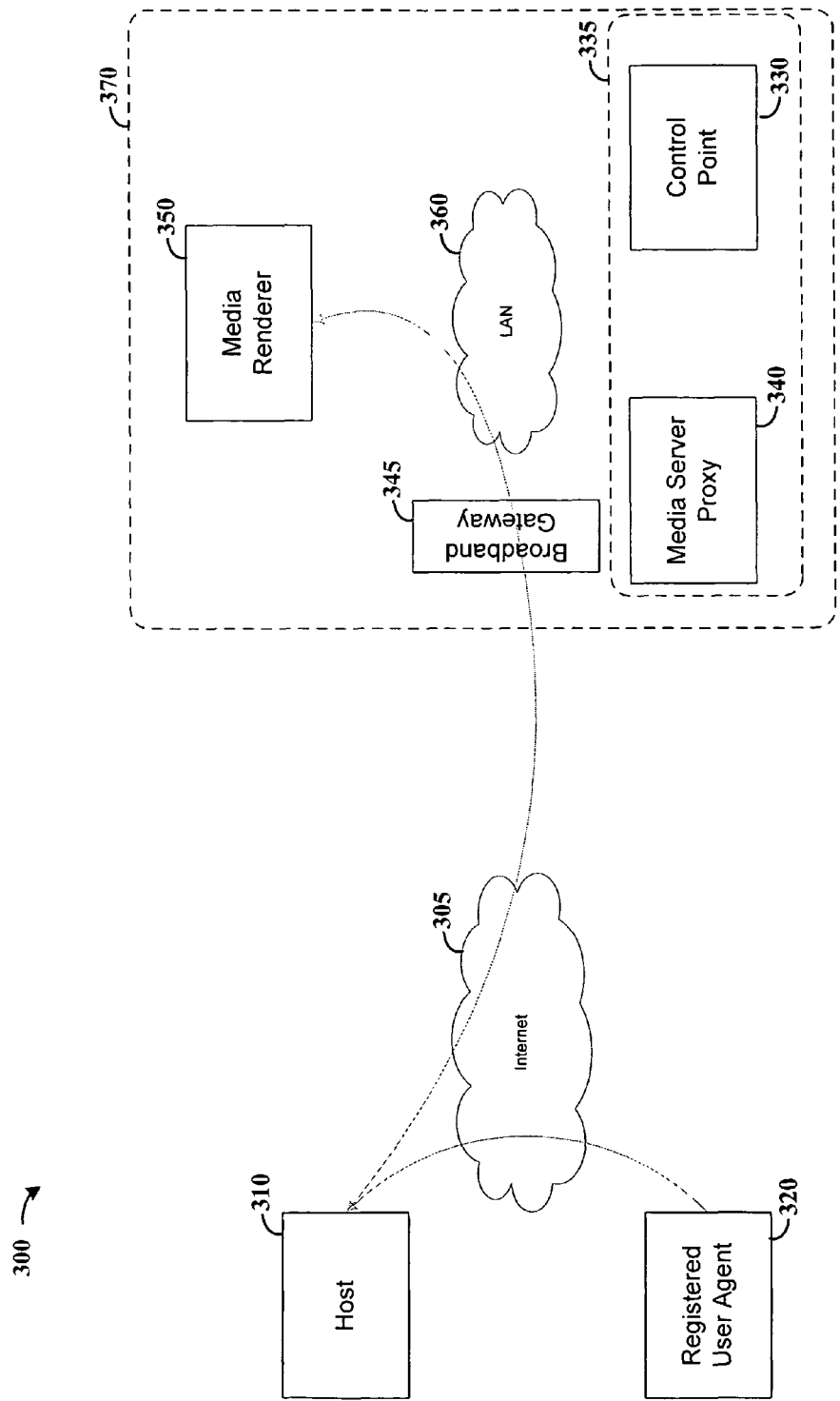

FIG. 3A and FIG. 3B show an arrangement 300 and approach for controlling content delivery, respectively showing control communications and subsequent content delivery approaches, according to another example embodiment of the present invention. The approaches shown in FIG. 3A and FIG. 3B and described below may also be implemented with the systems and approaches shown in FIG. 1, FIG. 2 and/or described with other example embodiments herein.

The system 300 includes a host 310, a registered user agent 320 and a broadband gateway 345, which communicate over a packet-based network 305, shown here implemented with the Internet. Generally, the registered user agent 320 is located at a registered user's data source, such as on the user's home PC that is connected to the Internet. The host 310 is located on the Internet 305 and is accessible by any Internet-capable device operated by a registered or guest user. The host 310 provides remote access to a registered user's data via the agent 320 in a manner similar to that described, for example, with the network-based server 110 in FIG. 1 above.

The system 300 also includes a media server (proxy) 340, implemented in communication with the broadband gateway 345 and a control point 330 (e.g., a programmed function on a device such as a user's hand-held telephone), over a local area network (LAN) 360. A media renderer 350 (e.g., an IP enabled stereo or television) also communicates via the LAN 360, and is responsive to control inputs received via the LAN, as well as for playback of media delivered over the LAN. Generally, the media renderer 350 has connectivity to the LAN 360, may or may not be publicly addressable via the Internet 305, and is adapted for establishing a HTTP connection with a host (310) on the Internet.

In some applications, the broadband gateway 345, the control point 330, the media server 340 and the media renderer 350 are located at a common premises 370 as shown by dashed lines, such as a home, business or other location, served by a LAN 360. In other applications, the LAN 360 serves more than one premises, such as a series of buildings housing operations for a particular business entity, and involves one or more networks that make up the LAN.

The media server 340 facilitates user interaction with devices on the LAN 360 using a local discovery and description protocol such as UPnP, and correspondingly, devices on a wide area network (WAN) such as the Internet 305 using Internet protocol (IP). In this regard, devices (including software-implemented devices) such as the host 310 and the registered user agent 320 that operate on a first protocol (e.g., wide area network (WAN) protocol such as IP) are able to communicate with devices in a system (300) that operate on a different and/or separate protocol such as UPnP or UPnP AV.

The media server (proxy) 340 is configurable and implemented in a variety of manners in connection with different embodiments. In some applications, the media server 340 is configured with the registered user's credentials (user name and password) to facilitate interaction with the host 310 and registered user agent 320. This configuration may include, for example, configuration for facilitating an interface (e.g., an application program interface (API)) with the registered user agent 320. Relative to each agent associated with a registered user accessing via control point 330, the media server 340 acts as a content directory service (e.g., to present a directory of content to the control point 330), as a connection manager service and as transport service.

In addition to different configuration approaches, the media server (proxy) 340 is also deployed in one or more of a variety of manners for different example embodiments, communicating via the LAN 360. In one embodiment, the media server 340 is implemented as a separate process running on a host device that also implements the control point 330, with the media server 340 and control point 330 communicating directly. In other applications, the media server 340 is implemented separately from the control point 330, with communications therebetween effected via the LAN 360. In one application, the media server is implemented on a separate device such as a personal computer (programmed with media server proxy functions) or a stand-alone device operating on the LAN 360. In some applications, the broadband gateway 345 and the media server 340 are implemented together using, for example, an Internet gateway that is programmed with media server proxy functions.

In some embodiments, the media server 340 is implemented together with the control point 330 on a registered user's mobile device, represented for illustrative purposes as device 335, such as a mobile handset. In these and other embodiments, a registered user's mobile device may include a mobile device owned and operated by a registered user (whose media content course is accessed), or another mobile device, owned by the registered user or another, operated by the registered user or another, and to which access has been granted by the registered user. The media server 340 is operated as a separate process running on the mobile device (e.g., a handheld terminal such as a mobile telephone personal data assistant device (PDA). In such approaches, the media server 340 and control point 330 functions communicate via a loopback interface or another form of interprocess communications (e.g., not necessarily communicating over the LAN 360). The media server 340 participates in the UPnP discovery and description approach, where new devices begin communications with the LAN 360 and other devices such as the media renderer 350. With these approaches, the media server 340 can be implemented with the control point 330, such that the control point 330 can function at different LAN 360 environments that need not necessarily implement the media server 340.

In some embodiments, the host 310 manages access to protected content accessed via the registered user agent 320, and facilitates the delivery of the protected content to the media renderer 350 in accordance with protection characteristics of the content. For instance, where a user implements his or her control point 330 to direct the delivery of purchased digital music, from the user's registered user agent 320 to the media renderer 350, the host 310 ensures that protection characteristics of the music are maintained. Where media rights associated with the music require that access to the purchased music be limited to the user and/or to one playback location at a time, the host 310 works to ensure that access to the purchased music is in accordance with the media rights. For general information regarding media rights, and for specific information regarding approaches to the implementation of various example embodiments of the present invention in connection with media rights protection and other functions, reference may be made to the above-referenced U.S. patent application Ser. No. 11/056,345 entitled "Network-distributed Data Routing."

In some applications, relative to examples discussed above involving the media server 340 implemented on a device local to the LAN 360 (e.g., separate from a registered user's mobile device), the host 310 facilitates the programming and/or operation of the media server 340 in accordance with such a user's settings at the user's registered user agent 320. For example, as described above, the media server 340 is configured with the registered user's credentials, which are used to facilitate the presentation of protected media for playback at the media renderer 350. In this regard, from the perspective of media rights associated with a user's digital media accessed via the registered user agent 320, the media server 340 becomes the registered user's device, relative to playback of the digital media and rights associated therewith.

Communications and control for media playback at the media renderer 350 are effected in one or more of a variety of manners. One approach, depicted with communication flow arrows in FIG. 3A and in FIG. 3B is as follows. Beginning with FIG. 3A, control messages are initiated at the control point 330 as UPnP actions. Messages targeting agent 320 are delivered to the media server 340 as UPnP Actions (or directly to the media server when implemented together with the control point on a common device). The media server 340 translates these control messages to an appropriate request and forwards the request to the host 310. For content delivery as shown in FIG. 3B, the media renderer 350 requests content from the registered user agent 320 through the host 310; a URL is provided to the media renderer 350, for example via the control point 330, resolves to the host 310 and includes appropriate access information (e.g., an electronic token as described with FIG. 1).

In some applications, two or more media renderers (350) are available for playback at the LAN 360. In such applications, the playback approach described above further involves the selection, at the control point 330, of one or more media renderers on which to playback media.

In another example embodiment, referring again to FIG. 3A and FIG. 3B, one or both of the media server 340 and the control point 330 are adapted to facilitate the identification of characteristics of the media renderer 350 via the LAN 360. The identified characteristics are provided to the host 310 and, where appropriate, used by the host 310 to configure media for playback at the media renderer 350 (e.g., to transcode the media for delivery and/or playback). In some applications, identification characteristics such as make and/or model of the media renderer 350 are obtained and used (e.g., by the host 310) to identify capabilities of the media renderer; media is configured in accordance with these identified capabilities. In other applications, the media renderer 350 provides characteristics directly, such as by indicating that media having a particular bitrate, protocol, resolution, audio format or other characteristic is preferred and/or required.

Figure 4:
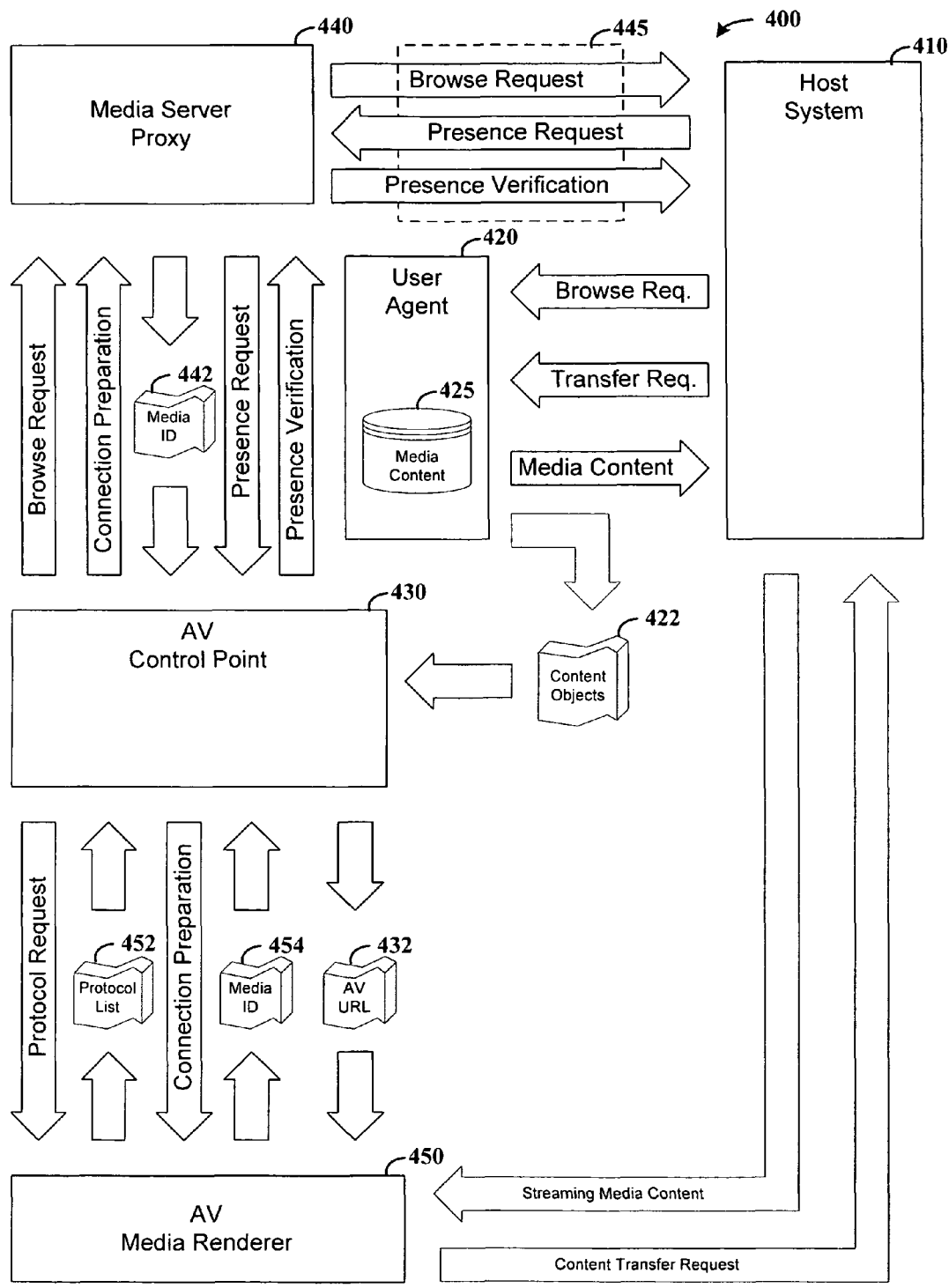
FIG. 4 is a flow diagram showing an approach to controlling the transfer of data, according to another example embodiment of the present invention.

FIG. 4 is a flow diagram and system 400 showing an approach to controlling the transfer of media content, according to another example embodiment of the present invention. The various components shown in FIG. 4 are implemented, for example, with one or more approaches as described herein for various applications. The approaches in the following description and the corresponding data flow shown in FIG. 4 are carried out in connection with one or more such example embodiments, involving a registered user controlling the playback of his or her media at a remote location.

Once at a remote location, the registered user implements his or her control point 430 to couple to a network (e.g., a wireless network) and sends a browse request to a media server 440. The browse request generally involves a query of a content directory available to the media server 440, such as a playback list established by the registered user, or media present in a cache or other location. The request is forwarded to a host system 410, using a gateway 445, via the Internet. The host system 410 authenticates the request (e.g., using authentication information as described above), and if authenticated, provides a browse request, via the Internet, to a user agent 420 having access to media content 425. The user agent 420 responds to the browse request by returning content objects 422 to an AV control point 430, either directly (shown) or indirectly via the host system 410. In some applications, the returned content objects 422 are limited to those that can be played back at the media renderer 450, either due to format or media rights associated with the data.

At the control point 430, a registered user views the content objects 422 to select media content for playback on a media renderer 450. To facilitate playback, the control point 430 sends a protocol request to the media renderer 450, which responds by returning a protocol list 452 characterizing one or more protocols that can be processed at the media renderer (e.g., an encoding type and transport approach supported by the media renderer). In some applications, the protocol list 452 includes playback information, such as an acceptable resolution or other data format. The control point 430 uses the protocol list 452 to select a protocol (or other format), and in some applications, compares the protocol list with available protocols (e.g., identified via the media server 440) and selects a matching protocol. The control point 430 sends a connection preparation request to each of the media server 440 and the media renderer 450, which respectively return media IDs 442 and 454 for a particular transfer instance (e.g., an Audio/Video (AV) transfer).

To facilitate delivery of the selected media content, the control point 430 sends an AV URL 432 to the media renderer 450, with the AV URL including information used for accessing data via the host system 410. Such information may include, for example, information that can be used by the host system 410 to identify and/or authenticate the transfer of data to which the URL corresponds, as selected by the registered user. In some applications, the AV URL 432 is provided in a manner similar to the provision of a token as described in the above-referenced patent document entitled "Token-based Remote Data Access."

When the media renderer 450 resolves the URL to the host system 410, the host system communicates a transfer request to the user agent 420, which in turn provides media content, from a local media content storage 425, to the media renderer, either via the host system 410 as represented, or directly. The content is streamed until stopped by one or both of the media renderer 450 and the control point 430.

In some applications, the host system 410 sends a presence request to the control point 430 via the gateway 445, which responds with a presence verification via the gateway if present on the local network to which the gateway is coupled. If the presence verification is not received by the host system 410, the streaming is stopped.

The following approach is implemented in connection with one or more example embodiments herein, with a user having a mobile handset device operating as a control point and media server (e.g., as described with device 335 in FIG. 3A). First, a user installs and provisions agent software on the user's media content source that operates to provide a network connection between the content source and a host server. In connection with this installation, the user registers for a service provided by the host server, and establishes authorization criteria (user name and password, or another type of criteria). The user also installs a handset application on the user's handset, such as a mobile phone, which facilitates interaction between the handset and the host server. The handset is functional for communicating over the Internet (e.g., to make a HTTPS connection).

Once installed, the user launches the handset application to access the user's media content source, via the host server. In some applications, the handset application prompts the user for his or her user name and password for providing this information to the host server. In certain applications, the handset also persists the user name and password so they do not need to be collected with each application launch.

When entering a remote network, the handset discovers available media renderers on the LAN using a protocols such as standard UPnP protocols. The handset application uses wireless (e.g., WiFi) capabilities of the handset to establish a LAN connection, with configuration of the wireless connection handled outside of the handset application as appropriate.

The user's media content source is presented as a source of media, or a media server-type of source, with a proxy for the media server implemented at the handset (e.g., as with the media server proxy 340). Generally, such an approach is used for one or more content sources accessible by the user, with such a media server proxy 340 effectively presenting accessible media across all of the available content sources.

The handset application communicates with the host server to authenticate the user and query the system for available agents. The handset application is adapted for using various interfaces available on the handset for this communication, to facilitate access to the network on which the host server resides, such as a gateway between a LAN and a WAN such as the Internet.

The handset application presents the user with a content directory for each available agent using, for example, a web page or other display approach. The user can then select content for delivery to a selected media renderer on the LAN, and a play (or similar) command is sent to the selected renderer. In some applications, the play command includes a URL, which is resolved by the renderer for requesting delivery of the content via the host server. Such an approach may be implemented, for example, as indicated with the URL 432 passed from the control point 430 to the media renderer 450 in FIG. 4.

The user stops rendering of content by issuing a stop command, or in a manner as described above when the handset leaves the LAN on which the renderer is connected. For example, a cancel request can be issued from the handset application to the host server, or a cancellation may be automatically effected when the server no longer communicates with the handset via the LAN (e.g., when a persistent connection is terminated).

In some embodiments, a streaming media cancel handler is implemented at media sources from which content is delivered to cancel the delivery of media as discussed above. For instance, referring to FIG. 1, the registered data source 130 and the network cache 140 may implement such a cancel handler as a plug-in or an extension to other programming (e.g., the U.A.R. 132) for streaming media. In some applications, such a cancel handler is accessible by the network-based server 110 for controllably canceling the streaming of media.

As discussed above, rights associated with media streamed to a remote media playback device are protected in one or more of a variety of manners. In one implementation, a user's mobile handset provides a key with a limited lifetime to the remote media playback device. The key is used to encrypt the streamed media at a source of the media and/or at a host facilitating the streaming media. The remote media playback device uses the key to access and playback the streamed media. Upon expiration of the key, the remote media playback device must reacquire a key from the handset, or can no longer playback the streamed media.

In some applications, handset-based key approach is implemented as follows, with description made in connection with FIG. 3A for illustration. A handset 335 provides a key with a short lifetime (e.g., a 5 minute lifetime) to the media renderer 350 via the LAN 360 using, for example, a UPNP protocol. The media renderer 350 uses the key to decrypt a media stream received via the host 310, and upon expiration of the key (or shortly prior to expiration to ensure seamless media playback), requests a new key from the handset if continued playback is desired.

The handset 335 responds to a request for a new key from the media renderer 350 by verifying that the media renderer is on the LAN 360 and, in some applications, that the media renderer has been previously selected by a user of the handset to receive media. In some applications, the handset 335 uses a discovery approach (e.g., with UPnP protocols) to determine whether the requesting media renderer 350 is on the LAN 360. In response to verifying the media renderer 350 (and its request), the handset 335 provides a new short lifetime key to the media renderer via the LAN to continue playback of the media.

In some embodiments involving a handset-provided key, the host 310 facilitates the provision of the key to the handset 335, which in turn selectively provides the key with a limited lifetime to the media renderer 350 as discussed above. In some applications, the host 310 encrypts a media stream received via the user agent 320, and in other applications, directs the user agent to facilitate the encryption (e.g., and providing the key to the user agent).

In some applications, the host 310 provides the key to the handset 335 with a lifetime, after which the key expires and is no longer useful for decrypting a particular media stream. In one application, host 310 provides the key to the handset 335 with a first lifetime (e.g., a few hours), and the handset in turn provides the key to the media renderer 350 with a shorter lifetime, as described above. The lifetime of the key provided to the handset 335 may, for example, be set to correspond to an expected playback time of media sent to the media renderer 350.

In other applications, the host 310 provides a key with a relatively short lifetime (e.g., 5 minutes as discussed above) to the handset 335, which in turn provides the key to the media renderer 350, without necessarily adjusting the lifetime of the key. In this regard, once the handset 335 leaves the LAN 360 and the short-lifetime key provided to the media renderer 350 expires, the media renderer can no longer playback the media stream.

In still other applications, the host 310 provides a key with a limited lifetime directly to the media renderer 350. When the media renderer 350 requests redelivery of the key, the host 310 responds to the request by ensuring that the handset 335 is still present on the LAN 360 (e.g., accessible within a predetermined number of hops from the gateway 345). In response to the handset being present, the host 310 re-sends the key with a new lifetime to the media renderer.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the functions carried out by servers, data sources and network caches are selectively implemented together and/or in different arrangements, depending upon the application. Further, data sources (or home network arrangements/devices) are selectively implemented with mobile-type devices, such as mobile Internet appliances (e.g., mobile telephones, laptops or personal devices); data can be made available from such devices to other remote devices. Agents and media servers are also implemented with other devices for various applications. Moreover, a variety of protocols that facilitate media transfer over local networks are used, some in place of those examples involving the use of the UPnP protocol, are implemented in connection with and/or as an alternative to the example embodiments. For instance, in some applications, the Bonjour protocol from Apple Computer, Incorporated of Cupertino, Calif., is implemented with the approached described above (e.g., involving a local network with a gateway, media renderer, control point and media server). These approaches are implemented in connection with various example embodiments of the present invention. Such modifications and changes do not depart from the true spirit and scope of the present invention, including that set forth in the following claims.

What is claimed is:

1. A method comprising:
   receiving, at an apparatus, one or more requests from a user mobile device to access a user-owned content source in a user device that is located in personal premises and connected to a data network, wherein the user mobile device is being connected to a remote network, and the user-owned content source is registered with the apparatus for a content access service;
   authenticating the one or more requests by the apparatus based on the registration of the user-owned content source;
   causing, at least in part by the apparatus, delivery of user-owned content from the user-owned content source to at least one playback device via the data network, a gateway coupled between the data network and the remote network, based on the authentication of the one or more requests, wherein the at least one playback device is identified in the one or more requests, and the delivery of user-owned content bypasses the apparatus, and wherein a key approach is used to enable the delivery of the user-owned content with a predetermined lifetime, the predetermined lifetime having a first lifetime and a second lifetime that is shorter that the first lifetime; and
   causing, at least in part by the apparatus, configuration of the user-owned content based on one or more capabilities of the media playback device, prior to the delivery.

2. A method of claim 1,
   wherein the at least one playback device is located in another personal premises.

3. A method of claim 2, further comprising:
   streaming the user-owned content after the configuration, wherein the delivery of the user-owned content is based on the streaming,
   wherein the at least one playback device is in proximity of the user mobile device and communicates with the user mobile device via a local network, and the another personal premises include a personal home.

4. A method of claim 3, further comprising:
   terminating the streaming in response to a determination that the user mobile device stops being connected to the remote network,
   wherein the at least one playback device is embedded in the user mobile device.

5. A method of claim 1, wherein the apparatus is a server connected to the data network.

6. A method of claim 1, wherein the apparatus is embedded in the user mobile device, and the personal premises include a personal home.

7. A method of claim 1, wherein the at least one playback device is identified by the user mobile device via a universal plug and play protocol, and the user-owned content source and the user mobile device belong to an identical user.

8. An apparatus comprising:
   at least one processor; and
   at least one memory including computer program code for one or more programs,
   the at least one memory and the computer program code, with the at least one processor, cause the apparatus to perform at least the following, receive one or more requests from a user mobile device to access a user-owned content source in a user device that is located in personal premises and connected to a data network, wherein the user mobile device is being connected to a remote network, and the user-owned content source is registered with the apparatus for a content access service;

authenticate the one or more requests based on the registration of the user-owned content source;

cause, at least in part, delivery of user-owned content from the user-owned content source to at least one playback device via the data network, a gateway coupled between the data network and the remote network, based on the authentication of the one or more requests, wherein the at least one playback device is identified in the one or more requests, and the delivery of user-owned content bypasses the apparatus, wherein a key approach is used to enable the delivery of the user-owned content with a predetermined lifetime, the predetermined lifetime having a first lifetime and a second lifetime that is shorter that the first lifetime, and cause, at least in part, configuration of the user-owned content based on one or more capabilities of the media playback device, prior to the delivery.

9. An apparatus of claim 8, wherein the apparatus is further caused to:

stream the user-owned content after the configuration, wherein the delivery of the user-owned content is based on the streaming.

10. An apparatus of claim 9, wherein the apparatus is further caused to:

terminate the streaming in response to a determination that the user mobile device stops being connected to the remote network.

11. An apparatus of claim 8, wherein the apparatus is a server connected to the data network.

12. An apparatus of claim 8, wherein the apparatus is embedded in the user mobile device.

13. An apparatus of claim 8, wherein the at least one playback device is identified by the user mobile device, and the user-owned content source and the user mobile device belong to an identical user.

14. A non-transitory computer-readable storage medium carrying one or more sequences of one or more instructions which, when executed by one or more processors, cause an apparatus to at least perform the following steps:

receiving one or more requests from a user mobile device to access a user-owned content source in a user device that is located in personal premises and connected to a data network, wherein the user mobile device is being connected to a remote network, and the user-owned content source is registered with the apparatus for a content access service;

authenticating the one or more requests based on the registration of the user-owned content source;

causing, at least in part, delivery of user-owned content from the user-owned content source to at least one playback device via the data network, a gateway coupled between the data network and the remote network, based on the authentication of the one or more requests, wherein the at least one playback device is identified in the one or more requests, and the delivery of user-owned content bypasses the apparatus, and wherein a key approach is used to enable the delivery of the user-owned content with a predetermined lifetime, the predetermined lifetime having a first lifetime and a second lifetime that is shorter that the first lifetime; and causing, at least in part by the apparatus, configuration of the user-owned content based on one or more capabilities of the media playback device, prior to the delivery.

15. A non-transitory computer-readable storage medium of claim 14, wherein the apparatus is caused, at least in part, to further perform:

streaming the user-owned content after the configuration, wherein the delivery of the user-owned content is based on the streaming.

16. A non-transitory A computer-readable storage medium of claim 15, wherein the apparatus is caused, at least in part, to further perform:

terminating the streaming in response to a determination that the user mobile device stops being connected to the remote network.

17. A non-transitory computer-readable storage medium of claim 14, wherein the apparatus is a server connected to the data network.

18. A non-transitory computer-readable storage medium of claim 14, wherein the apparatus is embedded in the user mobile device.

* * * * *